United States Patent [19]
Peck

[11] 3,753,421
[45] Aug. 21, 1973

[54] METHOD AND APPARATUS FOR CONTROLLING AN ANIMAL

[76] Inventor: Richard M. Peck, 3113 Club Dr., Allentown, Pa. 18103

[22] Filed: Dec. 20, 1971

[21] Appl. No.: 209,928

[52] U.S. Cl.................... 119/29, 119/106, 231/2 E
[51] Int. Cl............................................. A01k 15/00
[58] Field of Search..................... 119/29, 96, 106; 273/84; 231/2 E; 325/118, 119, 361, 364; 340/224

[56] References Cited
UNITED STATES PATENTS
3,589,337   6/1971   Doss ................................. 119/29
3,310,754   3/1967   Stewart ......................... 325/118 X
2,800,104   7/1957   Cameron et al. .................... 119/29

*Primary Examiner*—Louis G. Mancene
*Assistant Examiner*—J. N. Eskovitz
*Attorney*—Francis C. Browne, Joseph A. De Grandi et al.

[57] ABSTRACT

Method and apparatus for controlling a domestic animal to prevent it from moving into or out of a predetermined area wherein a signal emitting wire is placed to surround the area, and a low-powered, high voltage receiver circuit is mounted to the animal such as through a collar for receiving the signal from the wire and producing a physical effect on the animal as it approaches the wire.

13 Claims, 3 Drawing Figures

PATENTED AUG 21 1973    3,753,421
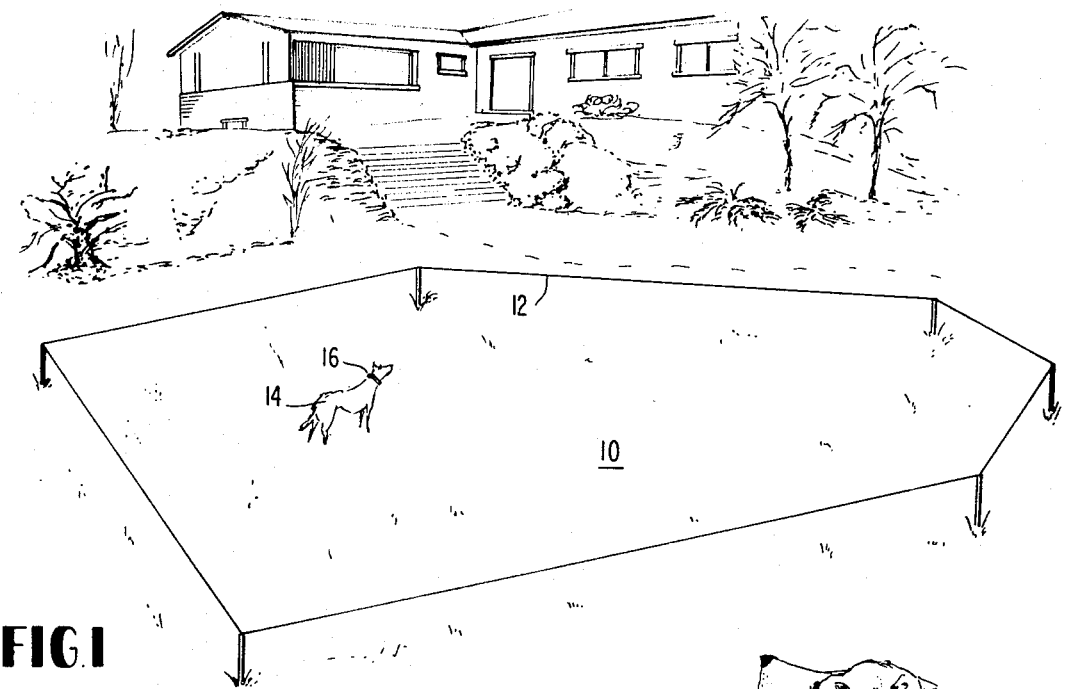
FIG.1
FIG.2
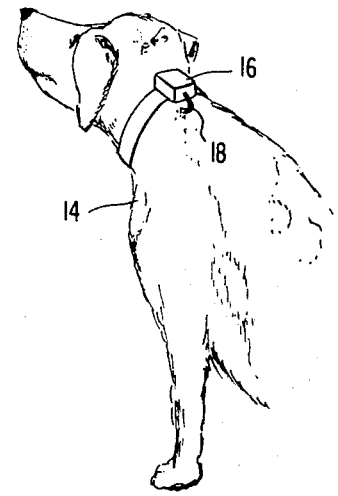
FIG.3
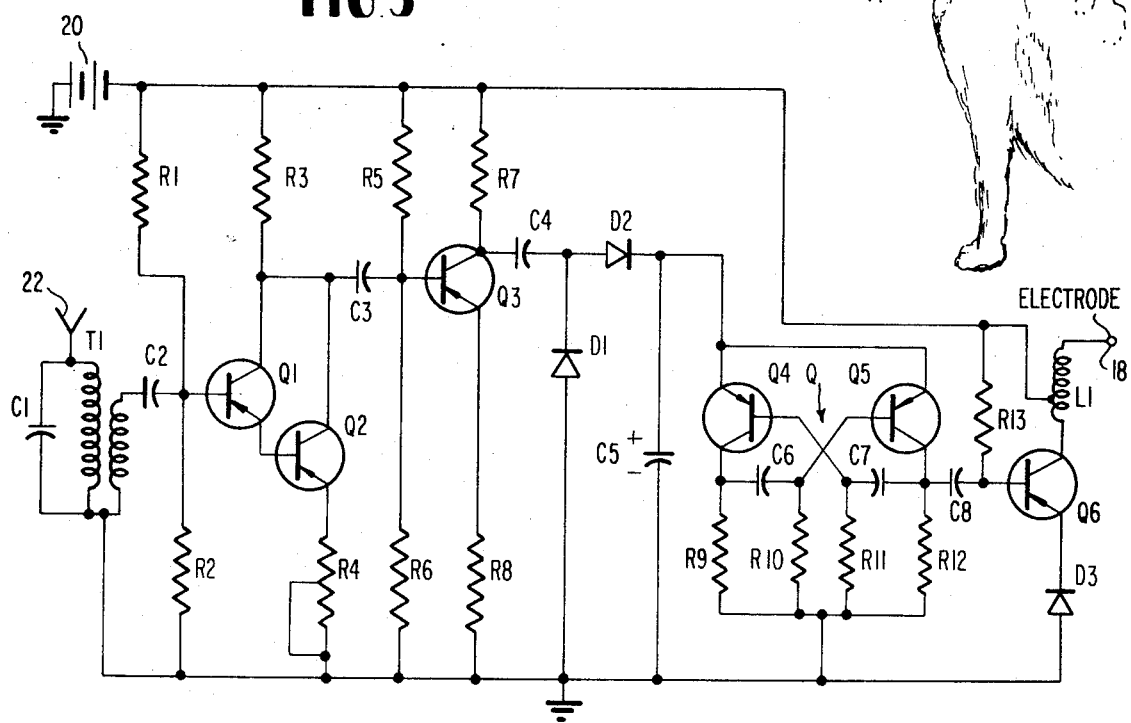

METHOD AND APPARATUS FOR CONTROLLING AN ANIMAL

OBJECT OF INVENTION

The present invention relates to method and apparatus for controlling the movement of an animal such as a dog or a cat.

One of the objects of the present invention is to provide a novel method and apparatus for controlling the movement of an animal such as a domestic dog or cat to prevent it from moving into or out of a predetermined area. Included herein is the provision of such a method and apparatus which, although effective in controlling the animal, does not require supervision, leashing or fencing of the animal, and furthermore, will not injure or otherwise seriously harm the animal.

A further object of the present invention is to provide such a method and apparatus which may be easily implemented in actual use without any special skill or excessive cost.

A further object of the present invention is to provide such an apparatus which may be easily manufactured for retail at relatively low prices and with a compact design susceptible for incorporation into a collar, blanket, harness or other article to be worn by the animal to be controlled.

SUMMARY OF INVENTION

In accordance with one embodiment of the invention when it is desired, for example, to prevent an animal from moving into or out of a predetermined area, an electrical antenna in the form of a wire is placed in or above the gound to surround the area to radiate a field in the vicinity of the wire when energized such as by an A.C. current alternating at a sub-broadcast band frequency. A receiver circuit is incorporated in an article such as a collar or blanket to be worn by the animal so as to receive signals from the wire when the animal approaches the wire. The receiver circuit includes an alarm which will produce a physical effect such as a noise annoying to the animal or a physical shock directly to the animal in response to certain signals received from the wire.

The receiver circuit is of the low-power, high voltage type preferably energized by a dry-cell battery. The receiver circuit further includes an antenna for picking up the signals radiated from the wire, an amplifier for amplifying the signal, and an oscillator circuit for operating the alarm means which may either be a loud speaker or a coil for producing a shock in the animal. The receiver circuit further includes an energy storing circuit for powering the oscillator means. The antenna is tuned to the frequency of the signal radiated from the wire.

In use, the receiving unit may be placed on an animal collar with the conductor positioned so as to make contact with the skin of the animal. When the animal approaches the signal emitting wire, the tuned antenna on the collar will pick up the signal and feed it to the voltage amplifier of the receiver circuit. The strength of the signal fed to the amplifier will vary with the proximity of the animal to the signal radiating wire. At the fringes of the signal field, the voltage will be small, and the amplified voltage applied to the D.C. energy storing circuit will be of low magnitude. At reduced voltage, the oscillator will cause an induction coil, associated with the conductor, to produce a mild shock to the animal. The intensity of the shock will increase almost expnentially as the animal gets closer to the signal radiating wire. However, the lower power characteristics of the circuit will never allow the shock to be hazardous to the animal. If the animal is positioned in the area enclosed by the signal radiating wire, the shock produced on the animal will prevent the animal from crossing the wire and thereby leaving the area. In situations where it is desired to prevent an animal from gaining access into an area, the animal will be positioned outside of the area enclosed by the signal radiating wire and will be prevented from crossing the wire into the area.

DRAWINGS

Other objects and advantages of the present invention will become apparent from the following more detailed description taken in conjunction with the attached drawings in which:

FIG. 1 is a perspective view of a residental home with an adjacent area to which it is desired to restrict an animal shown as a dog in accordance with the present invention;

FIG. 2 is a perspective view of a dog equipped with apparatus embodying the invention; and FIG. 3 is a schematic view of a circuit included in the apparatus of the present invention.

DETAILED DESCRIPTION

Referring now to the drawings in detail, there is shown in FIG. 1 an area 10 enclosed by a signal emitter in the form of an electrical wire 12, and an animal such as a dog 14 to be maintained within area 10 in accordance with the present invention. Wire 12 is capable of carrying an A.C. current alternating at a sub-broadcast band frequency (below 560 Kilohertz) for radiating signals in a field in the vicinity of the wire. The signal may be introduced into wire 12 by a transmitter that can be powered by any suitable means such as by a battery or an A.C. home power outlet. Furthermore, wire 12 may be buried in the ground or located above the ground. Although not shown wire 12 may be placed around shrubs, flowers, trees, and restricted areas for purposes of preventing entry thereto by an animal.

Signals emitted by wire 12 are to be picked up by an electronic receiver unit generally designated 16 mounted or otherwise incorporated in an article such as a collar, blanket, etc. to be attached to an animal as shown in FIG. 2. In the shown embodiment receiver unit 16 has a conductor 18 which is placed into engagement with the skin of the animal so as to impart a shock to the animal when it approaches wire 12. The shock causes the animal to stop and move away from the wire 12, thus maintaining the animal within the area 10.

Receiver unit 16 includes a low power, high voltage electronic circuit preferably powered by a miniature dry cell battery indicated at 20 in FIG. 3. Signals from wire 12 are picked up by a tuned antenna 22 connected to a resonant circuit including capacitor C1 and Transformer T1 that selects and presents a high impedance to the desired signal frequency. Frequencies above and below the desired frequency are attenuated or entirely rejected by shunting them to ground in a well known manner.

The selected signal is then coupled to a voltage amplifier Q1 and Q2 by the secondary winding on transformer T1 which matches the low input impedance of the amplifier. Voltage amplifier Q1 and Q2 is a high gain amplifier known in the art as a Darlington pair. The operating point of the amplifier is set by bias resistors R1 and R2. The amplified output signal is developed across a collector resistor R3 which is the load resistor. Additionally, an emitter resistor R4 is provided as a feedback resistor for circuit stability. The latter can also be used to set the gain of the voltage amplifier.

The output signal of the voltage amplifier is coupled to a low power amplifier Q3 to charge an energy storing capacitor C5. The A.C. signal developed across the transistor load resistor R7 is rectified to a D.C. voltage by diodes D1 and D2. A capacitor C5 is charged by the D.C. voltage and becomes the power source for an oscillator circuit Q shown as an astable multivibrator consisting of transistors Q4 and Q5 and associated circuitry. The oscillator produces a square wave output signal which is amplified by transistor Q6 and used to power induction coil L1 for producing a high voltage for shocking the animal through conductor 18. It will be understood that instead of a shock producing coil L1, a loudspeaker may be provided to produce a noise which would be annoying to the animals' sensitive ears.

Although not shown, the above described circuit can be modified to function with a transmitting antenna located centrally within area 10 to keep the animal from being shocked as long as it remained within the range of the transmitter. If the animal ventured towards the fringes of the signal field, the animal would start to receive mild shocks and as it wandered out of the field, the shocks would become more intense. The latter may be accomplished by rectifying the signal output of the voltage amplifier and then using the D.C. voltage to bias transistor Q3 into its cut-off or nonconducting region. Then, as the animal moves towards the fringes of the signal field, the amplified signal used to hold transistor Q3 at cut-off would be reduced and transistor Q3 would start to conduct. With transistor Q3 conducting, capacitor C5 would charge to power the oscillator circuit. As previously described, the oscillator output signal would then be amplified to power induction coil L1 which in turn would cause the animal to receive a shock.

It will also be understood that integrated circuits or other electronic components although not shown, could be substituted for the components shown in FIG. 3.

I claim:

1. A system for controlling the movement of an animal relative to an area, the system comprising in combination, means associated with said area for producing a signal, and an electronic receiver means to be placed on and carried by an animal, said receiver means including an alarm means for producing a physical effect annoying to the animal for controlling the movement of the animal relative to said area and means for receiving the signal from said signal means for initiating operation of said alarm means, said receiver means further including means for causing the intensity of the physical effect to be increased as the animal moves closer to said signal means.

2. The system defined in claim 1 wherein said means for producing said signal includes a wire carrying an A.C. current alternating at a sub-broadcast band frequency, and wherein said receiver means includes a low-powered battery operated high voltage circuit.

3. The system defined in claim 1 wherein said means for producing the signal encloses said area.

4. An article for attachment to an animal for purposes of controlling the same relative to a predetermined area, said article including an electronic circuit, said circuit including means for receiving a signal encompassing said area, alarm means responsive to said signal for producing a physical effect for controlling movement of the animal and means for varying the intensity of said alarm means depending upon the animal's changing position relative to the boundary of the area.

5. The article defined in claim 4 wherein said means for receiving said signal includes an antenna, and wherein said circuit further includes amplifier means for amplifying the signal, an energy storing circuit, a low-power induction coil connected to said alarm means to operate the same, and an oscillator circuit connected to said energy storing circuit and said coil for powering the coil to operate said alarm means.

6. The article defined in claim 5 including a low-power dry-cell battery connected to the circuit to provide power for the same, and wherein said coil is a high voltage low-power induction coil.

7. The article defined in claim 6 wherein said antenna is tuned to a predetermined frequency.

8. The article defined in claim 7 wherein said alarm means includes a conductor for shocking the animal.

9. The article defined in claim 7 wherein said alarm means includes a loudspeaker for producing a noise.

10. A method of controlling the movement of an animal with respect to a certain predetermined area comprising the steps of establishing a signal encompassing said area, and equipping the animal with an electronic receiving means responsive to said signal for producing a physical effect annoying to the animal when the animal approaches certain positions relative to the boundary of said area.

11. The method defined in claim 10 wherein said signal is established by energizing a wire enclosing said area to prevent the animal from crossing said wire into or out of said area.

12. A system for controlling the movement of an animal relative to a predetermined area, the system comprising in combination, means associated with said area for producing a signal encompassing said area, and an electronic receiver means to be placed on and carried by an animal, said receiver means including an alarm means for producing a physical effect annoying to the animal for controlling the movement of the animal relative to said area and means for receiving the signal from said signal means depending upon the position of the animal relative to the boundary of the area for initiating operation of said alarm means.

13. The system defined in claim 12, wherein said means for producing the signal is a wire enclosing said area.

* * * * *

REEXAMINATION CERTIFICATE (252nd)
United States Patent [19]
Peck

[11] B1 3,753,421
[45] Certificate Issued Sep. 25, 1984

[54] METHOD AND APPARATUS FOR CONTROLLING AN ANIMAL

[76] Inventor: Richard M. Peck, 3113 Club Dr., Allentown, Pa. 18103

Reexamination Request:
No. 90/000,423, Jul. 22, 1983

Reexamination Certificate for:
Patent No.: 3,753,421
Issued: Aug. 21, 1973
Appl. No.: 209,928
Filed: Dec. 20, 1971

[51] Int. Cl.³ .............................................. A01K 15/00
[52] U.S. Cl. ...................................... 119/29; 119/106; 231/2 E
[58] Field of Search ........................... 119/29, 96, 106

[56] References Cited
U.S. PATENT DOCUMENTS

| | | | |
|---|---|---|---|
| 2,023,950 | 12/1935 | Carter | 175/311 |
| 2,252,641 | 8/1941 | Poliakoff et al. | 179/82 |
| 2,405,501 | 8/1946 | Halstead et al. | 179/2 |
| 2,615,969 | 10/1952 | Albrecht | 177/311 |
| 2,663,800 | 12/1953 | Herzog | 250/36 |
| 2,721,896 | 10/1955 | Foot | 179/1 |
| 2,741,224 | 10/1956 | Putnam | 119/29 |
| 2,789,282 | 4/1957 | Winters | 340/258 |
| 2,800,104 | 7/1957 | Cameron et al. | 119/29 |
| 2,853,557 | 9/1958 | Lehman et al. | 179/82 |
| 2,904,645 | 9/1959 | Sarles | 179/171 |
| 2,908,766 | 10/1959 | Taylor | 179/82 |
| 2,921,141 | 1/1960 | Enikeieff | 179/82 |
| 2,996,043 | 8/1961 | Pettingill | 119/131 |
| 3,009,099 | 11/1961 | Muller | 324/52 |
| 3,021,391 | 2/1962 | Wagenseil et al. | 179/82 |
| 3,026,508 | 3/1962 | Muller | 340/282 |
| 3,051,936 | 8/1962 | Finger et al. | 340/280 |
| 3,076,058 | 1/1963 | Miller | 179/82 |
| 3,105,120 | 9/1963 | Hanysz | 179/82 |
| 3,110,891 | 11/1963 | Herrick et al. | 340/258 |
| 3,128,840 | 4/1964 | Barrett, Jr. | 180/77 |
| 3,150,321 | 9/1964 | Summers | 325/28 |
| 3,157,871 | 11/1964 | Umanoff | 340/280 |
| 3,162,726 | 12/1964 | Rosenberg et al. | 179/1 |
| 3,168,729 | 2/1965 | Volberg | 340/258 |
| 3,175,047 | 3/1965 | Borberg | 179/82 |
| 3,192,507 | 6/1965 | Sudges | 340/171 |
| 3,273,110 | 9/1966 | Monroe et al. | 340/4 |
| 3,309,690 | 3/1967 | Moffitt | 340/258 |
| 3,336,530 | 8/1967 | Sloan et al. | 325/29 |
| 3,341,842 | 9/1967 | Breguet | 340/384 |
| 3,346,856 | 10/1967 | Doble et al. | 340/258 |
| 3,383,595 | 5/1968 | Obata | 325/64 |
| 3,418,572 | 12/1968 | Humphreys, Jr. | 324/67 |
| 3,495,213 | 2/1970 | Nahas | 340/32 |
| 3,570,227 | 3/1971 | Bellinger | 56/25.4 |

OTHER PUBLICATIONS

Publication entitled "Planning Farm Fences," issued by American Association for Agricultural Engineering and Vocational Agriculture, Jun. 1966.

*Primary Examiner*—Hugh R. Chamblee

[57] ABSTRACT

Method and apparatus for controlling a domestic animal to prevent it from moving into or out of a predetermined area wherein a signal emitting wire is placed to surround the area, and a low-powered, high voltage receiver circuit is mounted to the animal such as through a collar for receiving the signal from the wire and producing a physical effect on the animal as it approaches the wire.

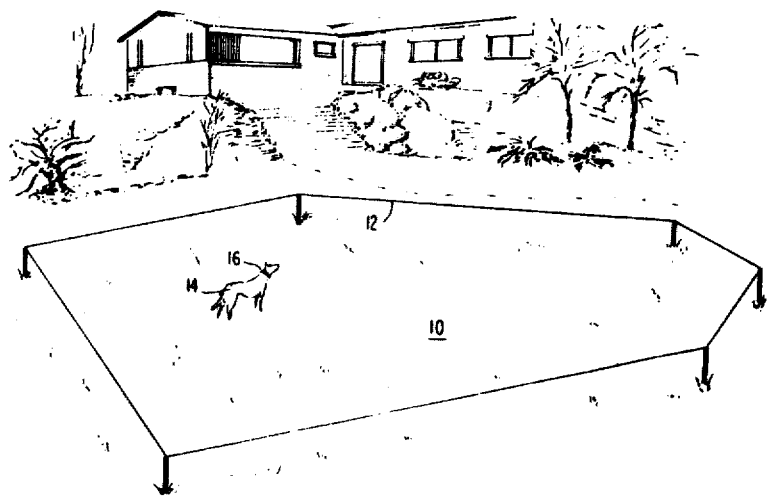

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-13 is confirmed.

* * * * *